(No Model.)
C. S. MORSE.
BICYCLE ATTACHMENT.
No. 606,389. Patented June 28, 1898.
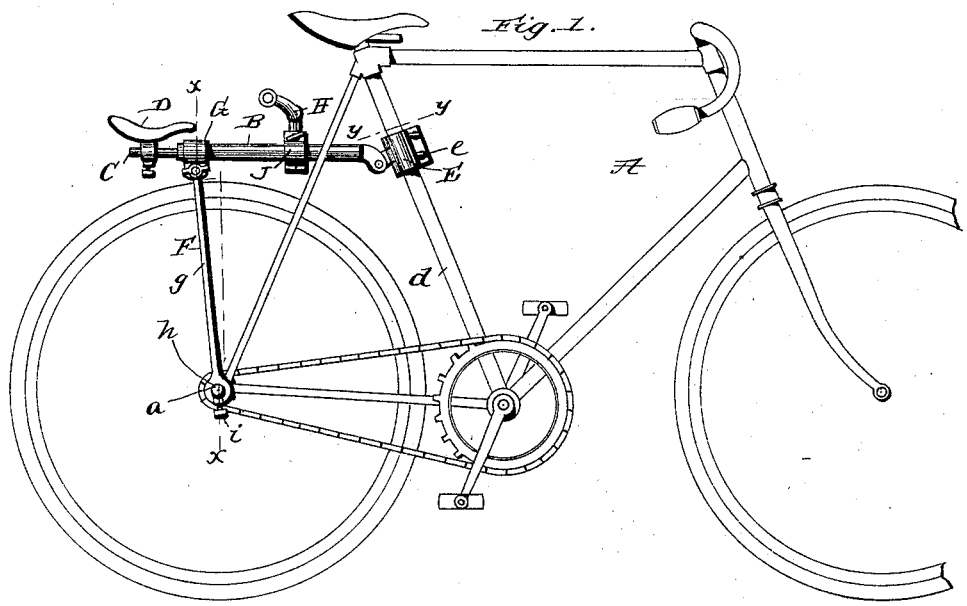
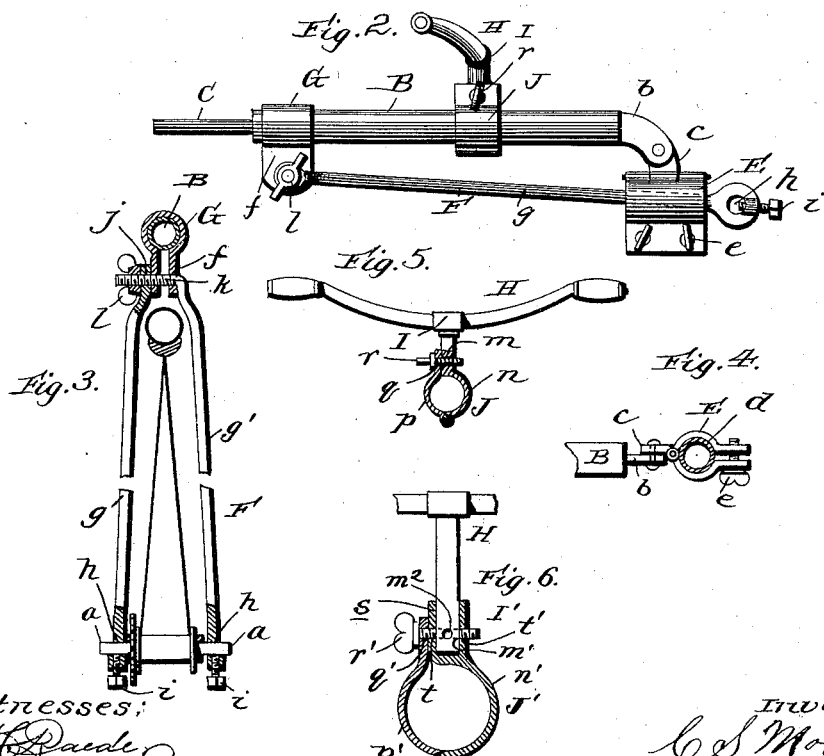
Witnesses:
Inventor
C. S. Morse
By James J. Sheehy
Attorney
THE NORRIS PETERS CO., PHOTO-LITHO., WASHINGTON, D. C.

UNITED STATES PATENT OFFICE.

CLIFTON STRATFORD MORSE, OF NEWARK, OHIO.

BICYCLE ATTACHMENT.

SPECIFICATION forming part of Letters Patent No. 606,389, dated June 28, 1898.

Application filed September 4, 1897. Serial No. 650,644. (No model.)

*To all whom it may concern:*

Be it known that I, CLIFTON STRATFORD MORSE, a citizen of the United States, residing at Newark, in the county of Licking and State of Ohio, have invented certain new and useful Improvements in Bicycle Attachments; and I do declare the following to be a full, clear, and exact description of the invention, such as will enable others skilled in the art to which it appertains to make and use the same.

My invention relates to improvements in bicycles, and has for its object to provide an attachment for safety-bicycles designed and adapted to afford a safe and comfortable seat for a child in rear of the rider and one which may be readily applied to and removed from ordinary safety-bicycles without scratching or otherwise injuring the same and which may be compactly folded when not in use, so as to take up but a minimum amount of space.

With the several foregoing ends in view the invention will be fully understood from the following description and claims when taken in conjunction with the annexed drawings, in which—

Figure 1 is a side elevation of a bicycle with my improved attachment applied thereto. Fig. 2 is an enlarged side elevation of the complete attachment as it appears when removed from the bicycle and folded up. Fig. 3 is a detail transverse section taken in the plane indicated by the line $x\,x$ of Fig. 1. Fig. 4 is a detail section taken in the plane indicated by the line $y\,y$ of Fig. 1. Fig. 5 is a view, partly in elevation and partly in section, illustrating the handle-bar, together with its clip; and Fig. 6 is a detail enlarged section of a modification.

In the said drawings similar letters designate corresponding parts in all of the several views, referring to which—

A designates a safety-bicycle, which may be of the ordinary construction with the single exception that instead of one step or extension $a$ the axle of its rear wheel is provided with two, as better illustrated in Fig. 3.

B designates the main bar of my improved attachment, which is preferably of steel tubing. This bar B is provided at its rear end with a seat-post C, which may be brazed and pinned or otherwise secured in said end and is designed for the connection of a saddle D, such connection being of the ordinary or any other suitable construction. At its forward end the bar B terminates in a flat end $b$, and this end is pivotally connected to a wing $c$ of a hinged clamp E, which is designed to embrace the king-post $d$ of the bicycle-frame and be secured thereon by screws $e$, which extend through apertures in the lugs of the clamp members and engage threads in one of said apertures. In this way it will be seen that the main bar B may be readily connected to and disconnected from the king-post of the bicycle. It will also be seen that the pivoted connection of the bar B to the clamp E permits free vertical motion of the bar B, and also permits of the clamp being swung down from the bar when the attachment is to be folded, as shown in Fig. 2. When desired, the clamp E may be provided with a leather lining, (not illustrated,) so as to prevent it from scratching or otherwise marring the enamel of the king-post $d$.

F designates the upright support of the bar B, which is preferably formed of spring-steel, and G designates a clip, preferably a forged steel one, which has apertured lugs $f$ and is designed to connect the support F with the main bar B. The support F preferably comprises two legs $g\,g'$, which have eyes $h$ at their lower ends to receive the extensions $a$ of the rear-wheel axle and also having set-screws $i$ for detachably fixing the eyes $h$ on said extensions $a$. The leg $g$ also has an eye $j$ at its upper end, while the leg $g'$ terminates at its upper end in a lateral threaded branch $k$, which extends through the apertures in the lugs $f$ of clip G and also through the eye $j$ of leg $g$ and is designed to receive a wing-nut $l$, as shown. In virtue of this construction the clip G is securely fixed upon the main bar B, and a strong and durable connection is effected between the legs of the support and the clip. The connection is also such that when the attachment is removed from the bicycle the legs of the support may be swung up and after their free ends are pressed together they may be secured between the members of the clamp E by the screws e, as shown in Fig. 2.

H designates the handle-bar of the attachment, which is preferably of wood, and I designates the stem of said bar, which has a threaded aperture m (see Fig. 5) and terminates in one member n of a hinge-clamp J, through the medium of which the handle-bar is fixed on the main bar B in such a manner as to permit of it being adjusted to suit the reach of the child rider. The other member p of the clamp J has an aperture q adjacent to its upper end and is designed to be connected to the member n by a screw r, which extends through the threaded aperture m, as shown.

In Fig. 6 I have illustrated a modified form of stem I' and clamp J'. In this construction the stem I' is provided with two apertures $m'$ $m^2$, disposed at right angles, and is arranged in a socket s on one clamp member n', the said socket s having diametrical apertures t t', the latter being threaded. The other clamp member p' is provided adjacent to its upper end with an aperture q' to receive a screw r'. In virtue of this construction it will be observed that when the screw r' extends through the aperture m' of stem I' the handle-bar H will be held in its proper operative position with respect to the main bar B, while when said screw r' extends through the aperture $m^2$ the handle-bar will rest in alinement with the said bar B. The screw r' being readily removable it will be appreciated that when the attachment is removed from a bicycle the handle-bar may be fixed in a position at right angles to that shown in Figs. 1, 2, and 5, so as to render the attachment more compact.

My improved attachment is connected to a bicycle by fixing the clamp E on the king-post of the bicycle-frame and the legs of the support F on the extensions a of the rear axle in the manner described. From this it follows that the attachment may be quickly connected to and disconnected from the bicycle without the employment of skilled labor or any implement other than an ordinary wrench, which is an important desideratum. The attachment is not only adapted to be quickly and easily connected to and disconnected from a bicycle, but is very simple and cheap and, being light, adds but little to the weight of the machine. The attachment is also perfectly safe, since when a small child is carried provision may be made for strapping it in a seat on the seat-post.

It is obvious that in addition to serving for the connection of the legs g g' the extensions a also serve as foot-rests for the child rider.

Having thus described my invention, what I claim is—

1. An attachment for bicycles comprising a main bar terminating at its forward end in a flattened portion, a hinge-clamp adapted to be fixed on the king-post of a bicycle-frame and having a wing pivotally connected to the flat portion of the bar, a clip arranged on said bar and having apertured lugs, and a support adapted to bear on the rear axle of a bicycle; the said support having a leg provided with an eye at its upper end, and a second leg provided with a lateral threaded branch extending through the apertures of the clip and said eye, and a nut on said branch, substantially as specified.

2. The combination of a bar, a handle-bar, a hinge-clip arranged on the first-named bar and comprising one member having a socket with apertures t, t', and a second member having an aperture, a screw extending through said aperture and the apertures t, t', of the socket, and a stem connected to the handle-bar and arranged in the socket of the clip member, and having diametrically opposite apertures for receiving the screw, substantially as specified.

3. A foldable attachment for bicycles comprising a main bar, a clamp pivotally connected with the forward end of said bar and having two members connected in a hinged manner and one or more screws for binding said members against the king-post of a bicycle-frame, and a support comprising legs adapted to straddle the rear wheel of a bicycle and bear on the extensions of the rear axle thereof; the said support being formed of spring metal and pivotally connected with the main bar, whereby, when it is not in use, its free end may be placed and secured in the clamp on the main bar by the screw or screws of said clamp, substantially as specified.

In testimony whereof I affix my signature in presence of two witnesses.

CLIFTON STRATFORD MORSE.

Witnesses:
JAMES R. FITZGIBBON,
JOHN FREAHY.